United States Patent [19]

Sarig et al.

[11] 4,211,062
[45] Jul. 8, 1980

[54] MACHINE FOR HARVESTING AGRICULTURAL PRODUCE

[76] Inventors: Yoav Sarig, 64 Henkin St., Holon; David Nahir, 19 KKL St., Bat Yam; Yekutiel Alper, 35 Har Zion St., Rishon Le Zion, all of Israel

[21] Appl. No.: 842,974

[22] Filed: Oct. 17, 1977

Related U.S. Application Data

[63] Continuation-in-part of Ser. No. 667,587, Mar. 17, 1976, abandoned.

[51] Int. Cl.² ............................................. A01D 51/00
[52] U.S. Cl. .................................................. 56/328 R
[58] Field of Search ..................... 56/1, 327 R, 328 R; 171/126

[56] References Cited

U.S. PATENT DOCUMENTS

| | | | |
|---|---|---|---|
| 1,558,924 | 10/1925 | Riggs | 56/328 R |
| 2,441,244 | 5/1948 | Kimball | 56/328 R |
| 2,639,573 | 5/1953 | McLaughlin | 56/328 R |
| 2,664,691 | 1/1954 | Wiebe | 56/328 R |
| 3,261,152 | 7/1966 | Johnson et al. | 56/328 R |
| 3,690,383 | 9/1972 | Malley et al. | 56/327 R X |
| 3,760,573 | 9/1973 | Porter | 56/327 A |
| 3,872,657 | 3/1975 | Ramacher | 56/328 R |
| 3,986,561 | 10/1976 | Bellencourt et al. | 56/327 R X |

Primary Examiner—Russell R. Kinsey
Attorney, Agent, or Firm—Holman & Stern

[57] ABSTRACT

In a machine for picking-up agricultural produce from the ground of the type including a carriage movable over the ground, an inclined endless conveyor having at any given time sections constituting a pick-up section and a returning section and further comprising means for moving the conveyor, the improvement which comprises a conveyor with a pick-up section adapted to be moved by said means in the direction of travel of said carriage and a portion of a returning section thereof being adapted to lie loosely on the ground and to fold back upon itself at the point where the returning section changes its direction to constitute a part of the pick-up section, whereby there is formed a small turning radius at said point with the beginning of the pick-up section in close proximity to the ground.

6 Claims, 3 Drawing Figures

MACHINE FOR HARVESTING AGRICULTURAL PRODUCE

This application is a continuation in part and of the application Ser. No. 667,587 filed on Mar. 17, 1976. and now abandoned.

The present invention relates to an improvement in agricultural produce harvesting machines and more particularly, this invention concerns improvements in a produce pick-up conveyor including its arrangement and operation in relation to a movable carriage on which it is mounted.

The invention further relates to a machine for picking-up agricultural produce from the ground and separating foreign matter and debris which adhere thereto prior of depositing the collected produce in a suitable collecting container.

The invention is especially suitable for harvesting agricultural produce like pecan nuts and similar spheroidal or rollable agricultural produce, from heavy soil and/or wet soil during the winter season without disturbing the surface of the ground.

In accordance with the present invention there is provided in a machine for picking-up produce from the ground of the type including a carriage over the ground, an inclined endless conveyor having at any given time sections constituting a pick-up section and a returning section and further comprising means for moving the conveyor, the improvement which comprises a conveyor with a pick-up section adapted to be moved by said means in the direction of travel of said carriage and a portion of a returning section thereof being adapted to lie loosely on the ground and to fold back upon itself at the point where the returning section changes its direction to constitute a part of the pick-up section, whereby there is formed a small turning radius at said point with the beginning of the pick-up section in close proximity to the ground.

While various nuts and fruit harvesting apparatus are known in the art, for example those described in U.S. Pat. Nos. 1,558,924, 2,664,691 and 3,261,152, in none of said apparatus is there a pick-up section of a conveyor, upon which the harvested nuts or fruit are picked up from the ground and conveyed thereon and which is moved in the direction of travel of the carriage on which said conveyor is mounted; and none of these or other prior art harvesting apparatus teach or suggest to employ a portion of a returning section of the pick-up conveyor in the manner taught by this invention namely, in a manner in which said portion lies loosely on the ground and preferably freely folds back upon itself at the point where the returning section changes its direction to constitute the beginning of the pick-up section, whereby there is thus formed a small turning radius at said point.

The above described unique features of this invention result in several advantages the main advantages of which can be summed up as being: (a) the achievement of a pick-up surface which lies very close to the ground which in turn, results in a more thorough and economical manner of harvesting produce from the ground as said produce does not have to be initially raised from the ground onto the lowermost edge of a conveyor which, in accordance with the prior art apparatus is displaced from the ground at a higher level than with the conveyor arrangement of this invention; and (b) the speed of travel of the conveyor section which touches the ground relative the ground is substantially zero while the picking-up section of the conveyor travels at a speed greater than the speed of travel of the carriage relative the ground.

The above advantages of the present invention are especially useful when harvesting in heavy and/or wet soil where it is desired to merely propel the produce without attacking the ground itself i.e. scraping or scratching the soil and thus as the lowermost edge of the picking-up conveyor is very close to the ground, it is not required to apply the usual vigorous force to initially propel the fruit onto the elevated level of the known pick-up conveyors.

With specific reference now to the figures in detail it is stressed that the particulars shown are by way of example and for purposes of illustrative discussion only and are presented in the cause of providing what is believed to be the most useful and readily understood description of the principles and conceptual aspects of the invention. In this regard no attempt is made to show structural details of the system and its apparatus in more detail than is necessary for a fundamental understanding of the invention the description taken with the drawing making apparent to those skilled in the art of agricultural methods and machinery therefor how the several forms of the invention may be embodied in practice.

Figure 1:
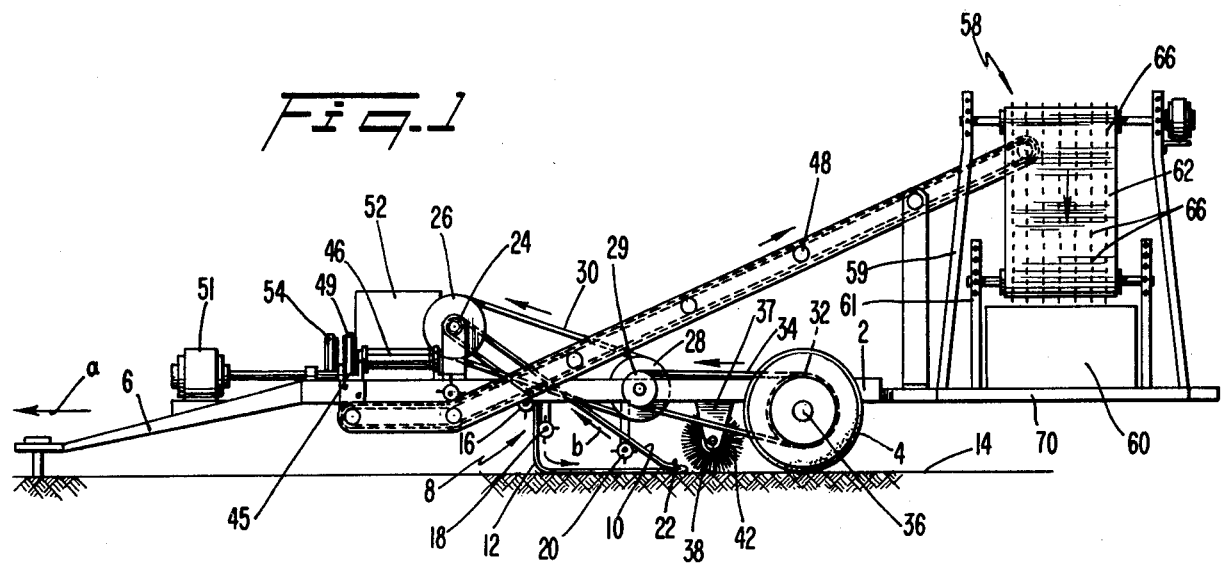
FIG. 1 is a side view of the harvesting and debris removing machine of the invention, diagrammatically showing the arrangement of the main features of the invention.

While the harvesting machine of the present invention may be a self-propelled vehicle, there is shown in the figures a harvesting machine including a carriage 2 supported by a pair of wheels 4 and adapted to be towed, e.g. by a tractor, by means of a towing shaft 6 extending from the carriage and to be moved in the direction as indicated by the arrow a.

As is further seen in the drawings, the machine comprises a first inclined endless conveyor, generally indicated by the numeral 8 mounted on the carriage by means of brackets 9 and 11 (FIG. 2) and having a pick-up section 10 adapted to move in the direction of arrow b and a returning section 12 a portion of which is adapted to lie loosely on the ground 14. The conveyor 8 has preferably a substantially smooth outer surface, that is to say, a surface without projecting elements, and is guided between guide sprockets 16, 18 and 20 so that at the point 22 where the returning section 12 changes its direction to constitute a part of the pick-up section 10, the conveyor freely folds back upon itself whereby there is formed a small turning radius at said point with the beginning of the pick-up section positioned in close proximity to the ground. It will be realized that a guiding roller of small diameter (not shown) could be provided at said turning point without appreciably increasing the desired small turning radius achieved in the preferred embodiment shown.

The conveyor 8 is supported and driven by means of a drive sprocket 24 which sprocket is, in turn, rotated by means of a pulley 26 driven by a pulley 28 via an endless belt 30. Pulley 28 is coupled to another pulley 29 which, by means of an endless belt 34 is driven by a pulley 32 rigidly connected to the axle 36 and, thus, rotating together with the carriage wheels 4. The above described conveyor driving arrangement is a simple known per-se driving system and does not constitute a part of the invention especially since it should be realized that other known per-se driving arrangements such as a hydraulic motor, may just as well be employed for rotating the conveyor 8 at any desired speed.

Across the lowermost part of the pick-up section of the conveyor 8 and adjacent thereto, there is mounted on the carriage 2 by means of suitable brackets 37 a drum-like fingered feeder 38 which is rotatably powered by means of e.g. a hydraulic motor 40. The fingers 42 of feeder 38 are preferably resilient fingers made of rubber and are adapted to propel the produce which is scattered on the ground onto the conveyor without digging into the soil. Alternatively, instead of the fingered drum-like feeder 38, the produce may be propelled onto the conveyor by means of an air blower. The air blower 44 may be powered either by means of driving gears and belt arrangement or by means of a motor (not shown). In operation as the machine moves along the ground on top of the scattered produce, the speed at which the returning section 12 moves is preferably determined by the speed of movement of the machine and equal and opposite thereto, so that there is no relative movement between conveyor at the point 22 of the pick-up section and the ground. This preferred arrangement is very efficient because it facilitates the continuous picking up and conveying of small quantities of produce which can be easily propelled onto the pick-up conveyor while allowing the drum-like fingered feeder 38 to rotate at a low speed.

Since the lowermost pick-up portion of the conveyor is almost at ground level, there is no need to employ means of relatively high power rating for propelling the produce onto a substantially higher level than the ground and it is sufficient to only relatively very lightly rack the scattered produce in the direction of the pick-up conveyor to propel the same thereon.

Consequently the pick-up capability of the machine is optimal even when the produce propelling means 38 or 44 operate at a low power rate and thus the overall power consumption of the machine can be kept relatively low.

The subsequent separation of the produce from the foreign materials may be achieved in several ways and a preferred method and apparatus for achieving said separation will now be described with reference to the drawings.

Figure 2:
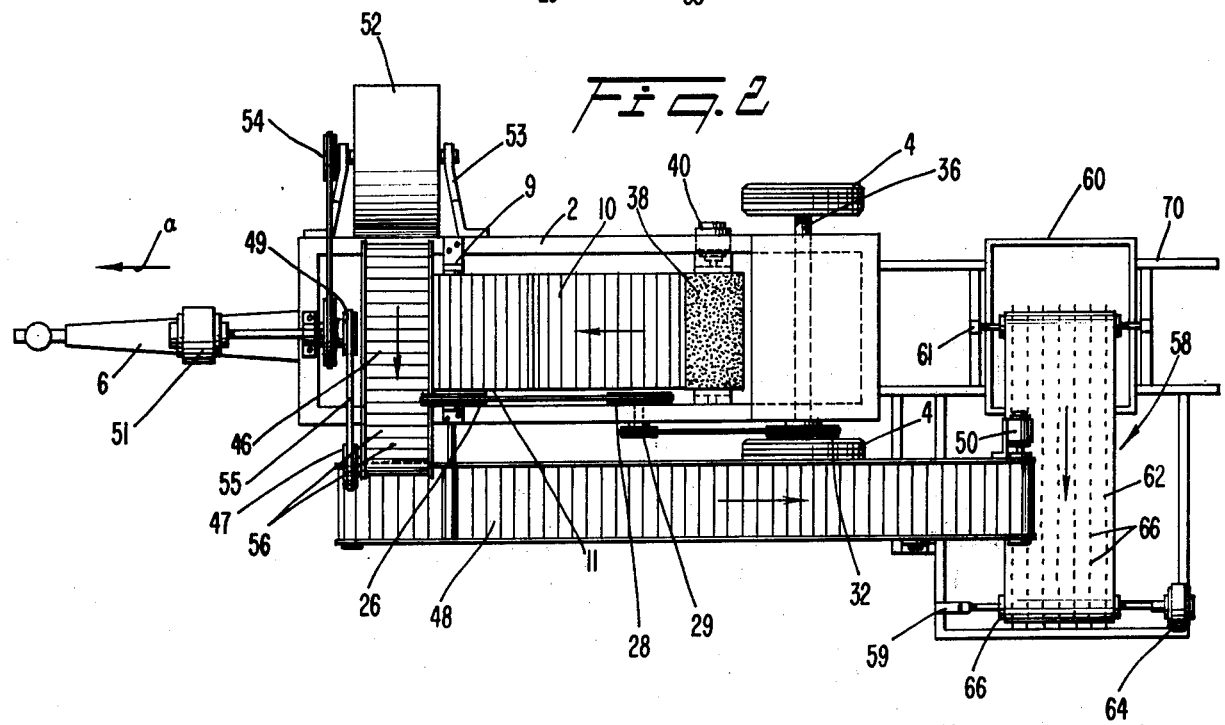
FIG. 2 is a schematic top plan view of the machine of FIg. 1.
Figure 3:
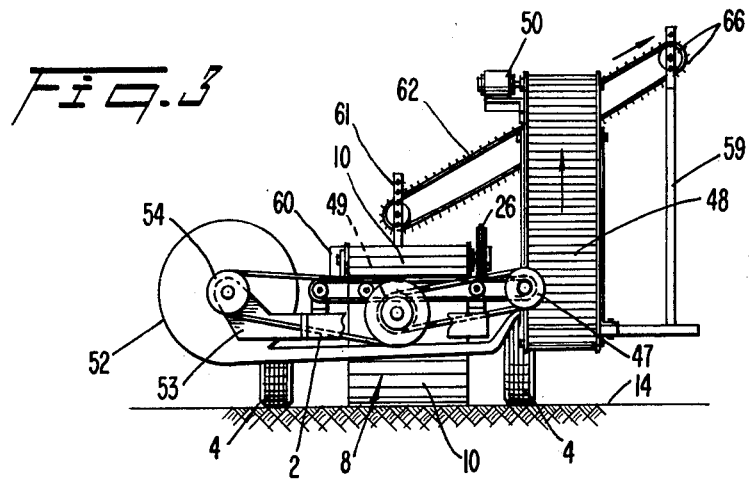
FIG. 3 is a schematic front view of the machine of FIg. 1.

As best seen in FIG. 2, a second conveyor 46 is transversely mounted on the carriage by means of brackets 45 (FIG. 1) adjacent to the upper end of the inclined pick-up conveyor 8 and also transversely to the lower end portions of a third inclined conveyor 48. While, as it is schematically indicated in FIG. 2, conveyor 46 is driven by pulleys 47 and 49 and belt 55 from a hydraulic motor 51 the conveyor 48 is driven by means of a conventional hydraulic motor 50. An air blower 52 mounted on the carriage by brackets 53, also driven by a sprocket and belt arrangement 54, is situated adjacent the end of the conveyor 46, and is adapted to blow and direct a stream of air along the longitudinal axis of the conveyor. The foreign materials which have to be separated and removed from the produce usually consist of earth clods, twigs and leaves which first must be separated from said produce. The said clods are removed while the produce is conveyed along the conveyor 46 by allowing the dirt to fall in-between the conveyor's slats 56, while the leaves and twigs are separated from the produce by means of the stream of air which is blown by the blower 52. The stream of air causes the separation of the produce from the unwanted debris during the time that said produce travel upon conveyor 46 until reaching the third conveyor 48. The latter conveyor merely functions as an elevator adapted to transfer the content of conveyor 46 onto a further separating unit 58 supported on the carriage by a height-adjustable framework 59, 61 whose task is to completely separate the produce from the foreign materials and to cause the harvested produce to be collected in a container 60 supported on an auxilliary frame 70 at the rear of main frame 2.

The preferred unit for said further separating and collecting operation comprises an inclined endless belt 62 driven by a hydraulic motor 64. The belt 62 is made of rubber or the like, and its surface is provided with projections 66. This combination of a moveable inclined rubber belt having projections on its surface serves the dual purpose of causing the lighter foreign materials to be conveyed upwardly by the projections 66 on the inclined belt and to be discharged onto the ground at the conveyor's upper turning point, while allowing the heavier round or ellipsoid-shaped produce to roll down the belt under the influence of gravity, and to be discharged into the collecting container 60.

The angle of inclination of conveyor 62 can be adjusted by means of framework 59 and/or 61 in accordance with the specific harvested produce and the type of debris etc. which are encountered during operation. Additionally, in order to prevent occasional fruits or nuts from being discharged together with the debris, a brush type barrier (not shown) can be mounted at the upper turning point of the inclined conveyor 62, so that only small twigs, leaves etc. will be discharged from this end.

Finally, it will be evident to those skilled in the art that the invention is not limited to the details of the foregoing illustrative embodiment and that the present invention may be embodied in other specific forms without departing from the spirit or essential attributes thereof. It is therefore desired that the present embodiments be considered in all respects as illustrative and not restrictive, reference being made to the appended claims, rather than to the foregoing description, in which it is intended to claim all modifications coming within the scope and spirit of the invention.

What is claimed is:

1. A machine for picking-up produce from the ground including a carriage movable over the ground in a specified direction of travel, said carriage being provided with an inclined endless conveyor having at any given time sections constituting an inclined receiving and conveying section and a returning section adjoining said inclined section, drive means for moving the conveyor with said inclined section moving in the specified direction of travel of said carriage, means for guiding a portion of said returning section of said conveyor to lie loosely on the ground and to fold back upon itself to constitute a part of the inclined section, with a small turning radius at a point where said returning section joins said inclined section and with the beginning of the inclined section in close proximity to the ground, and means for propelling produce from the ground onto said inclined section of said conveyor.

2. The machine according to claim 1 wherein said inclined section of said conveyor is adapted to move at a speed at least equal to the speed of travel of said carriage.

3. The machine as claimed in claim 1 wherein said propelling means comprises a rotatable drum-like fingered feeder mounted on said carriage in close proximity to and across said conveyor at the beginning of the pick-up section.

4. The machine as claimed in claim 1 further comprises a second conveyor mounted on said carriage across the top end of said inclined section and adapted to remove foreign materials from the produce when conveyed therealong; a third inclined conveyor mounted on said carriage and extending from the end of said second conveyor parallel to said first conveyor and adapted to carry the produce onto a further included inclined debris separating unit mounted on said carriage adjacent to the top end of the third conveyor; and a produce collecting container mounted on the carriage at the bottom end of said separating unit.

5. The machine as claimed in claim 4 further comprising an air blower mounted on the carriage adjacent to an end of said second conveyor and adapted to blow a stream of air onto the surface of said second conveyor to separate from the produce at least some of the foreign materials which adhere to the produce.

6. The machine as claimed in claim 4 wherein said separating unit comprises an endless belt having projections on its surface adapted to convey the debris to be discharged at its upper turning point and to allow the produce to roll down along its surface to be discharged into said collecting container.

* * * * *